United States Patent [19]

Cuevas

[11] Patent Number: 5,195,777
[45] Date of Patent: Mar. 23, 1993

[54] AIR BAG INFLATOR
[75] Inventor: Jess A. Cuevas, Scottsdale, Ariz.
[73] Assignee: TRW Inc., Lyndhurst, Ohio
[21] Appl. No.: 837,334
[22] Filed: Feb. 18, 1992
[51] Int. Cl.$^5$ .............................................. B60R 21/26
[52] U.S. Cl. ................................... 280/736; 280/742; 222/3; 251/64
[58] Field of Search ................. 280/736, 737, 742; 222/3; 251/64

[56] References Cited

U.S. PATENT DOCUMENTS

| | | |
|---|---|---|
| 3,638,964 | 2/1972 | Chute . |
| 3,661,299 | 5/1972 | Durstewitz ................... 280/736 X |
| 3,865,273 | 2/1975 | Zeigler ........................ 280/737 X |
| 3,900,211 | 8/1975 | Russell et al. .............. 280/742 X |
| 3,966,226 | 6/1976 | Roth ............................. 280/737 |
| 5,016,914 | 5/1991 | Faigle et al. ................ 280/742 X |

OTHER PUBLICATIONS

Design Data for the Preliminary Selection of Honeycomb Energy Absorption Systems, Hexcel Corp., Jun. 1966.

Primary Examiner—Charles A. Marmor
Assistant Examiner—Gary C. Hoge
Attorney, Agent, or Firm—Tarolli, Sundheim & Covell

[57] ABSTRACT

An air bag inflator includes a gas source and a gas outlet opening to allow flow of gas from the gas source into the air bag. A valve assembly for controlling flow of gas through the gas outlet opening includes a piston disposed in a cylinder. The piston has a surface against which the gas acts to move the piston in a first direction in the cylinder to allow increased flow of gas through the gas outlet opening. A honeycomb is disposed in the path of movement of the piston. The honeycomb is preferably made of aluminum or stainless steel. As the piston moves in the cylinder, the honeycomb crushes, resisting the movement of the piston.

7 Claims, 2 Drawing Sheets

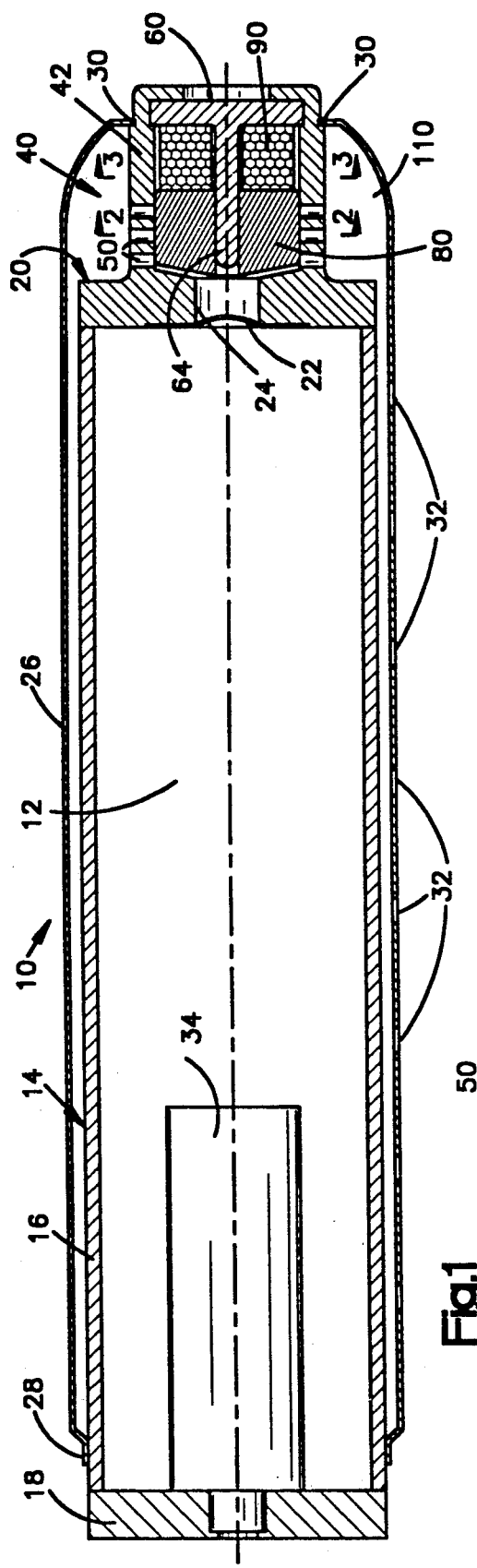
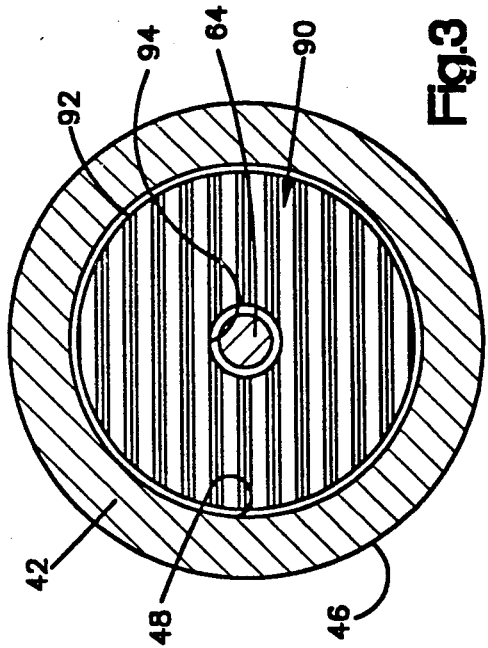
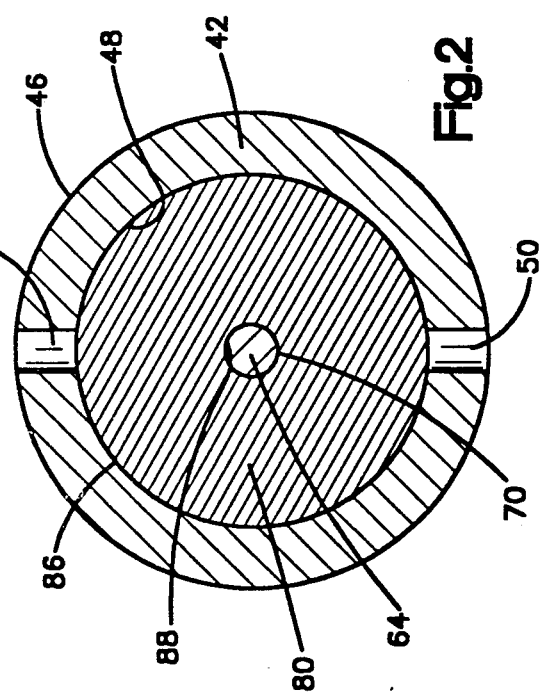

AIR BAG INFLATOR

BACKGROUND OF THE INVENTION

1. Technical Field

The present invention relates to an air bag inflator, and more particularly to apparatus for controlling the rate of gas flow from an air bag inflator.

2. Description of the Prior Art

A known vehicle safety apparatus includes an air bag and an inflator for providing gas to inflate the air bag. A quantity of gas is stored under pressure in the inflator. Upon actuation of the inflator, the gas is released and directed into the air bag to inflate the air bag.

In a vehicle safety apparatus including an air bag, it is desirable to control the pressure in the air bag to ensure that the air bag inflates by the desired amount at the desired time. Controlling the rate of gas flow into the air bag controls bag inflation. A valve assembly is typically used to control the rate of gas flow out of the inflator into the air bag. U.S. Pat. No. 3,638,964 discloses an air bag inflator having a movable member for controlling the release of gas into an air bag. A quantity of silicone oil or grease is forced through an outlet to retard and thereby control movement of the movable member.

SUMMARY OF THE INVENTION

The present invention is an apparatus for inflating a vehicle occupant restraint such as an air bag. The apparatus includes a gas source and means for defining a gas outlet opening in the gas source to allow flow of gas from the gas source into the air bag to inflate the air bag. Valve means for controlling flow of gas through the gas outlet opening includes a cylinder and a piston disposed in the cylinder. The piston has a surface against which the gas acts to move the piston in a first direction in the cylinder to allow increased flow of gas through the gas outlet opening. A honeycomb is disposed in the path of movement of the piston. The honeycomb is preferably made of aluminum or stainless steel. As the piston moves in the cylinder, the honeycomb is crushed. The honeycomb thus resists the movement of the piston to control flow of gas through the outlet opening.

BRIEF DESCRIPTION OF THE DRAWINGS

The foregoing and other features of the present invention will become apparent to one skilled in the art upon a consideration of the following description of the invention with reference to the accompanying drawings, wherein:

FIG. 1 is a longitudinal sectional view of an inflator embodying the present invention;

FIG. 2 is a transverse sectional view taken along line 2—2 of FIG. 1;

FIG. 3 is a transverse sectional view taken along line 3—3 of FIG. 1;

DESCRIPTION OF PREFERRED EMBODIMENT

Figure 4:
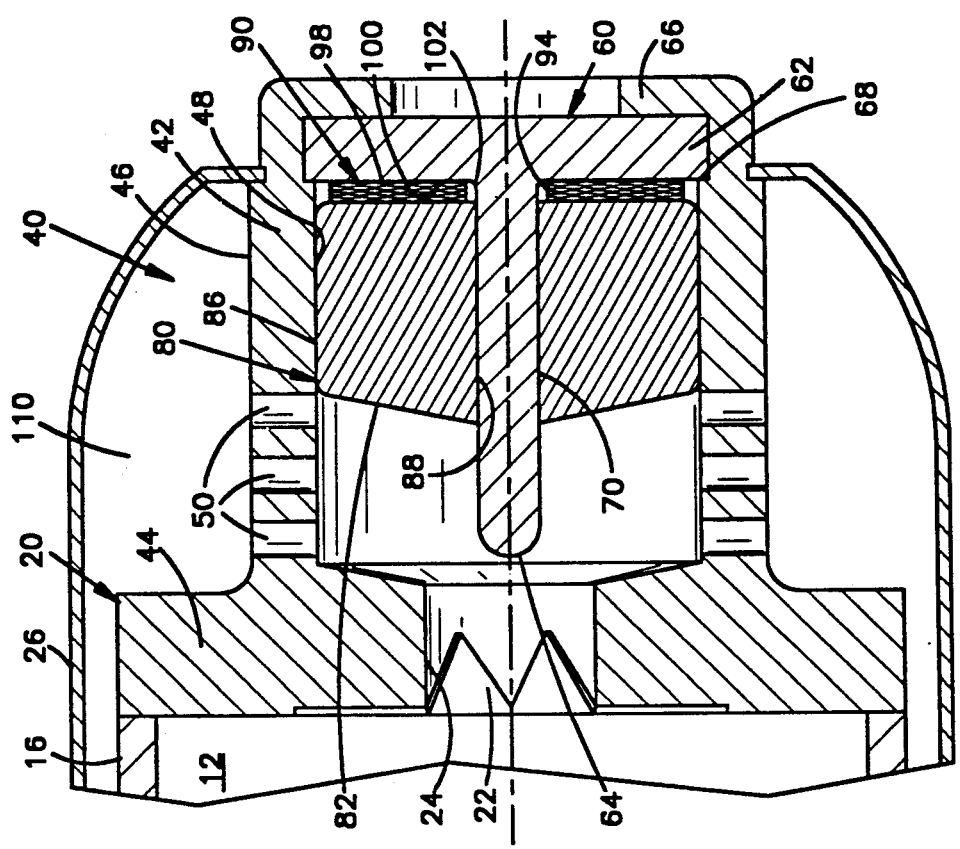
FIG. 4 is an enlarged view of a portion of FIG. 1 showing a valve assembly in a first condition.

The present invention relates to an air bag inflator and particularly to an inflator for inflating an air bag to protect the passenger of a vehicle. The present invention is applicable to various inflator constructions. As representative of the present invention, FIG. 1 illustrates an inflator 10 for inflating an air bag (not shown) to protect the passenger of a vehicle. The inflator 10 is an augmented inflator having a quantity of gas stored in a container in the inflator, usually under pressure. The inflator includes an initiator and a quantity of combustible material disposed in the container. Upon actuation of the inflator, the initiator ignites the combustible material, which generates heat to raise the pressure of the gas in the container. The combustible material also generates additional gas to augment the gas stored in the container The stored gas and the gas generated by the combustible material are directed into the air bag to inflate the air bag. It should be understood that the present invention could be embodied in an inflator which uses only combustible material to generate gas, rather than in an augmented inflator.

The inflator 10 includes a quantity of gas 12 stored under pressure in a container 14. The gas 12 is preferably argon, although other gases such as nitrogen or air could be used. The container 14 includes a housing 16 and two end caps 18 and 20. An initiator assembly 34, which includes an initiator and a quantity of combustible gas generating material, is disposed within the gas 12 in the container 14 adjacent the end cap 18. A burst disk 22 seals an opening 24 in the end cap 20.

A cylindrical diffuser tube 26 extends around the container 14. One end of the diffuser tube 26 is secured at 28 to the housing 16 near the end cap 18. The other end of the diffuser tube 26 is secured at 30 to the end cap 20. The diffuser tube 26 has a series of outlets 32 along its length to direct gas from the inflator 10 into the air bag.

The inflator 10 includes a valve assembly 40 for controlling the flow of gas 12 out of the inflator. The valve assembly 40 includes a cylinder 42 formed as part of the end cap 20. The cylinder extends axially outward from a radially extending portion 44 of the end cap 20. The cylinder 42 has a cylindrical outer surface 46 (FIG. 3) and a cylindrical inner surface 48 between which extend a series of radial gas outlet openings. 50.

A piston guide 60 is secured in the cylinder 42. The piston guide 60 has a radially extending base portion 62 and a guide pin 64 projecting axially from the base portion. The guide pin 64 has a cylindrical outer surface 70 extending parallel to the inner surface 48 of the cylinder 42. A radially extending portion 66 of the end cap 20 clamps the piston guide base portion 62 against an undercut surface 68 of the end cap to retain the piston guide 60 in the cylinder 42.

A piston 80 is disposed in the cylinder 42. The piston 80 has a radially extending surface 82 facing axially inward toward the burst disk 22. The piston 80 also has a radially extending surface 84 facing axially outward toward the piston guide base 62. The piston 80 has a cylindrical outer surface 86 in sliding engagement with the inner surface 48 of the cylinder 42, and a cylindrical inner surface 88 defining a central opening through which the guide pin 64 extends.

A honeycomb 90 is also disposed in the cylinder 42. The honeycomb 90 is preferably made of aluminum or stainless steel honeycomb material which may be purchased from Hexcel Corporation of Dublin, Calif. The honeycomb 90 is in the shape of an annulus having a generally cylindrical outer circumferential surface 92 and a generally cylindrical inner circumferential surface 94. The honeycomb 90 has a radially extending axially inner end face 96 and a radially extending axially outer end face 98. The honeycomb 90 includes a plurality of layers of cells extending transverse to the guide pin 64 including a first layer 104 adjacent the piston 80 and second and subsequent layers separated from the piston by the first layer. The cells of the honeycomb 90 extend generally parallel to its end faces 96 and 98.

The axially inner end face 96 of the honeycomb is in abutting engagement with the surface 84 of the piston 80. The axially outer end face 98 of the honeycomb 90 is in abutting engagement with a radially extending surface 100 of the piston guide base 62. The honeycomb 90 is disposed radially between the inner surface 48 of the cylinder 42 and the piston guide pin 64. The radially outer surface 92 of the honeycomb 90 is spaced from the inner wall 48 of the cylinder 42. The radially inner surface 94 of the honeycomb 90 is spaced from the outer surface 70 of the guide pin and is held in position by a radiused portion 102 of the piston guide 60 located at the junction between the guide pin 64 and the piston guide base 62.

FIG. 4 illustrates the parts of the valve assembly 40 in a first condition prior to actuation of the inflator 10. The burst disk 22 is intact, maintaining the gas 12 in the container 14. The piston 80 is disposed at the axially inner end of the cylinder 42 between the opening 24 and the gas outlet openings 50. The honeycomb 90 is disposed between the piston 80 and the piston guide base 62.

Figure 5:
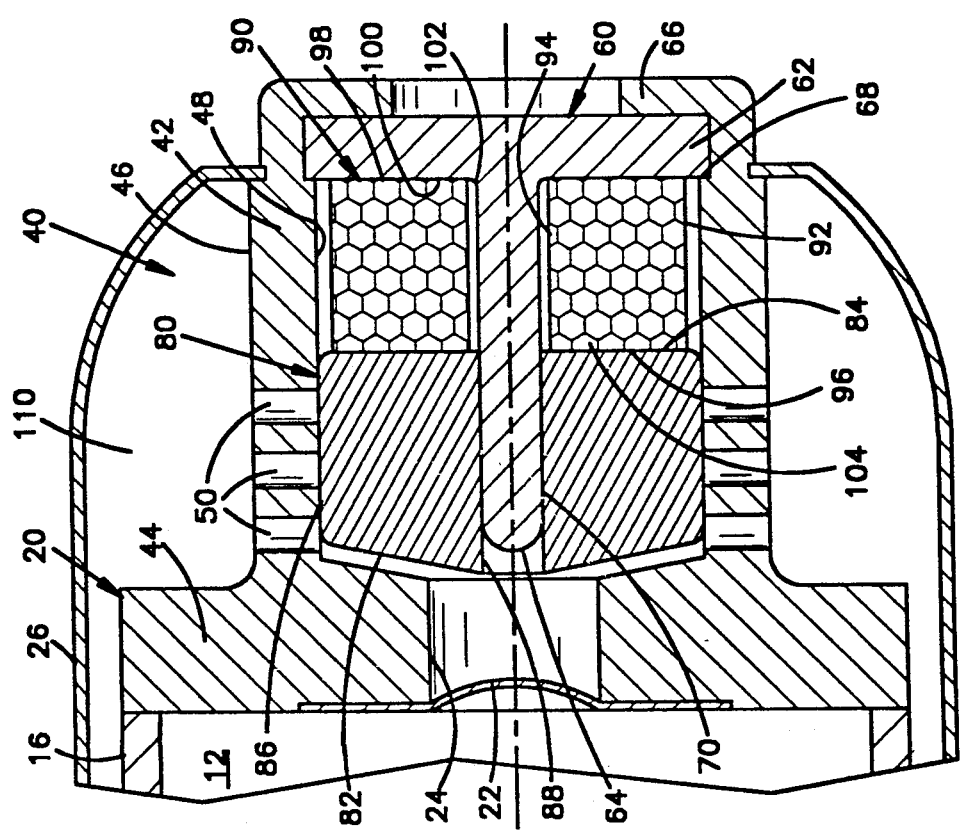
FIG. 5 is a view similar to FIG. 4 showing the valve assembly in a second condition.

Upon actuation of the inflator 10, the initiator assembly 34 heats the gas 12 in the container 14 to raise its pressure. The initiator assembly 34 also generates additional gas to augment the gas stored in the container 14. When the gas pressure in the container 14 reaches a predetermined level, the burst disk 22 bursts, as shown in FIG. 5. The gas contacts the surface 82 of the piston 80, causing the piston to move in a first direction in the cylinder 42, from the position shown in FIG. 4 to the position shown in FIG. 5.

The honeycomb 90 is disposed in the path of movement of the piston 80 with the cells of the honeycomb oriented transversely to the path of movement. The honeycomb 90 resists and slows movement of the piston 80 but does not block such movement. The force exerted by the moving piston 80 on the honeycomb 90 causes the honeycomb to be crushed between the moving piston and the piston guide base 62. The honeycomb 90 crushes from its axially inner surface 96 to its axially outer surface 98. The axially innermost layer 104 of cells adjacent the piston 80 crushes first, then succeeding layers of cells crush as the piston moves in the cylinder 42. When the piston 80 has completed its path of movement in the cylinder 42, the honeycomb 90 is crushed into a thin mass of material as seen in FIG. 5.

As the piston 80 moves in the cylinder 42, it exposes the gas outlet openings 50. The gas from the container 14 flows through the opening 24 and through the gas outlet openings 50 into a space 110 between the container 14 and the diffuser tube 26. The gas then flows out through the outlets 32 in the diffuser tube 26 and into the air bag (not shown) to inflate the air bag.

As the piston 80 moves in the cylinder 42, the piston exposes an increasing amount of gas exhaust area through the gas outlet openings 50. The speed of movement of the piston 80 is controlled by the honeycomb 90. The material of the honeycomb 90 has a linear crush rate. Therefore, as the piston 80 travels down the cylinder 42, the honeycomb 0 provides an even resistance to the movement of the piston. The construction of the honeycomb 90 can be varied to control the crush rate of the honeycomb and thus the rate of movement of the piston 80 in the cylinder 42. Thus, by selecting an appropriate honeycomb 90, it is possible to control the rate of gas flow from the inflator 10 into the air bag.

From the above description of the invention, those skilled in the art will perceive improvements, changes and modifications in the invention. Such improvements, changes and modifications within the skill of the art are intended to be covered by the appended claims.

I claim:

1. Apparatus for inflating a vehicle occupant restraint, comprising:

a gas source, means for defining a gas outlet opening in said gas source to allow flow of gas from said gas source into the vehicle occupant restraint to inflate the vehicle occupant restraint, and valve means for controlling flow of gas through said gas outlet opening, said valve means comprising a piston slidably received in a cylinder, said piston having a first surface against which said gas acts upon actuation of said apparatus to move said piston in a first direction to allow increased flow of gas through said gas outlet opening, said valve means including a crushable honeycomb disposed in the path of movement of said piston for controlling movement of said piston in said cylinder.

2. Apparatus as defined in claim 1 wherein said cylinder comprises a longitudinally extending wall defining the path of movement of said piston, said cylinder having an axially inner portion in which said gas outlet opening is formed, said piston being disposed in a first position in said inner cylinder portion prior to actuation of said apparatus, said cylinder including an axially outer portion in which said honeycomb is disposed, said gas acting to move said piston from said first position to a second position at least partially in said axially outer portion of said cylinder against the resistance of said honeycomb.

3. Apparatus as defined in claim 2 wherein said piston is in the shape of an annulus having an axially extending central opening, said honeycomb is in the shape of an annulus having an axially extending central opening, and further comprising a guide pin fixed to said cylinder and extending through said central openings of said piston and said honeycomb to guide movement of said piston in said cylinder.

4. Apparatus as defined in claim 1 wherein said honeycomb comprises a plurality of layers of cells extending transverse to said first direction including a first layer adjacent said piston and a second layer separated from said piston by said first layer, movement of said piston in said first direction acting to crush said layers of cells sequentially beginning with said first layer and then said second layer.

5. Apparatus as defined in claim 1 wherein said honeycomb has a linear crush rate.

6. Apparatus as defined in claim 1 wherein said honeycomb is made of aluminum.

7. Apparatus as defined in claim 1 wherein said honeycomb is made of stainless steel.

* * * * *